United States Patent
Suhre et al.

(10) Patent No.: US 8,870,279 B2
(45) Date of Patent: Oct. 28, 2014

(54) PASSENGER SEAT RECLINE AND TRAY TABLE SUPPORT MECHANISM

(71) Applicant: B/E Aerospace, Inc., Wellington, FL (US)

(72) Inventors: Ryan J. Suhre, Winston-Salem, NC (US); Jeffrey W. Hontz, Winston-Salem, NC (US)

(73) Assignee: B/E Aerospace, Inc., Wellington, FL (US)

( * ) Notice: Subject to any disclaimer, the term of this patent is extended or adjusted under 35 U.S.C. 154(b) by 47 days.

(21) Appl. No.: 13/804,526

(22) Filed: Mar. 14, 2013

(65) Prior Publication Data

US 2013/0249257 A1  Sep. 26, 2013

Related U.S. Application Data

(60) Provisional application No. 61/614,841, filed on Mar. 23, 2012, provisional application No. 61/614,822, filed on Mar. 23, 2012.

(51) Int. Cl.
| | |
|---|---|
| *A47B 83/02* | (2006.01) |
| *B64D 11/06* | (2006.01) |
| *B60Q 3/02* | (2006.01) |
| *B60N 2/46* | (2006.01) |
| *B60R 11/00* | (2006.01) |
| *B60N 3/00* | (2006.01) |

(52) U.S. Cl.
CPC ........ *B64D 11/06* (2013.01); *B64D 2011/0679* (2013.01); *B60Q 3/0223* (2013.01); *B60N 2/4606* (2013.01); *B60R 11/00* (2013.01); *B60N 3/004* (2013.01)
USPC ............ 297/163; 297/165; 297/167; 297/169

(58) Field of Classification Search
CPC .. B64D 2011/0679; B60N 2/24; B60N 11/06; B60N 3/004
USPC .................................. 297/163, 165, 167, 169
See application file for complete search history.

(56) References Cited

U.S. PATENT DOCUMENTS

| | | | | |
|---|---|---|---|---|
| 2,098,426 | A * | 11/1937 | McDonald | 297/146 |
| 3,588,172 | A * | 6/1971 | McGregor | 297/169 X |
| 3,910,632 | A * | 10/1975 | Marechal | 297/232 |
| 4,141,586 | A * | 2/1979 | Goldner et al. | 297/167 |
| 4,159,071 | A * | 6/1979 | Roca | 297/163 |
| 4,431,231 | A * | 2/1984 | Elazari et al. | 297/163 |
| 4,511,178 | A * | 4/1985 | Brennan | 297/163 X |
| 5,133,587 | A * | 7/1992 | Hadden, Jr. | 297/146 |
| 5,169,209 | A * | 12/1992 | Beroth | 297/163 X |
| 5,540,483 | A * | 7/1996 | Marechal | 297/169 X |
| 6,550,861 | B1 * | 4/2003 | Williamson | 297/163 X |

(Continued)

*Primary Examiner* — Rodney B White
(74) *Attorney, Agent, or Firm* — Shumaker, Loop & Kendrick, LLP

(57) ABSTRACT

A passenger seat recline mechanism including a fixed seat frame member supporting a pivot shaft about which a seat back link and a tray table link independently pivot, a seat back pivotally connected to the seat back link such that the seat back link pivots forward as the seat back reclines, and a tray table leg pivotally connected to the tray table link such that the tray table link pivots along with the seat back link when the tray table leg is stowed and pivots independently of the seat back link when the tray table leg is deployed.

18 Claims, 4 Drawing Sheets

(56) References Cited

U.S. PATENT DOCUMENTS

| | | | |
|---|---|---|---|
| 6,742,840 B2 * | 6/2004 | Bentley | 297/316 |
| 6,827,026 B2 * | 12/2004 | Williamson et al. | 108/44 |
| 7,784,862 B2 * | 8/2010 | Pozzi et al. | 297/167 |
| 8,205,938 B2 * | 6/2012 | Speh et al. | 297/163 |
| 8,336,957 B2 * | 12/2012 | Roy et al. | 297/163 |
| 8,517,464 B2 * | 8/2013 | Ruiz et al. | 297/163 X |
| 2011/0187163 A1 * | 8/2011 | Westerink et al. | 297/163 |
| 2011/0204683 A1 * | 8/2011 | Roy et al. | 297/163 |

* cited by examiner

PASSENGER SEAT RECLINE AND TRAY TABLE SUPPORT MECHANISM

CROSS-REFERENCE TO RELATED APPLICATIONS

This application claims priority to U.S. Application No. 61/614,841 filed Mar. 23, 2012 and U.S. Application No. 61/614,822 filed Mar. 23, 2012, the contents of which are incorporated herein by reference.

TECHNICAL FIELD AND BACKGROUND OF THE INVENTION

The present invention relates generally to a cradle type seat recline mechanism, and more particularly, to a seat recline and tray table support mechanism that provides independent pivoting movement of the seat back and tray table such that the tray table can maintain attitude and elevation when deployed irrespective of the position of the seat back.

Aircraft passenger seats are typically configured to recline during a flight to enhance comfort. While some premium class seats can achieve a lie flat seating position for maximum comfort, most economy class seats are limited to a shallow recline because of space constraints as a result of high seating densities and the proximity of other seats. Most conventional economy class seats recline by way of a seat back that pivots between an upright and a reclined seating position, disadvantageously reclining into the living space of an aft-seated passenger. Most economy seats also include a tray table pivotally attached to the seat back that moves along with the seat back as it reclines. Thus, the passenger actually using the tray table does not have full control over the position of the tray table, causing frustration and discomfort.

Accordingly, what is needed is a tray table that moves independently of the recline mechanism of the supporting seat, as well as a seat having a cradle recline motion that minimizes encroachment into the space behind the seat. A desirable mechanism would also be simple and packaged well to fit within the confines of space found alongside an aircraft passenger seat.

SUMMARY OF THE INVENTION

Therefore, it is an object of the present invention to provide a passenger seat recline and tray table support mechanism that overcomes the disdavantages of prior art seat recline mechanisms.

It is a further object of the invention to provide an aircraft passenger seat including a seat recline mechanism wherein the position of the seat back does not dictate the attitude or elevation of a deployed tray table supported by the seat.

It is a further object of the invention to provide a seat recline and tray table support mechanism in which the tray table stows flush against the seat back and deploys to a horizontal position apart from the seat back for use by an aft-seated passenger.

It is a further object of the invention to provide a seat recline and tray table support mechanism that is packaged well and fits within the confines of space found alongside a seat.

It is a further object of the invention to provide an improved cradle type recline motion for an aircraft passenger seat.

These and other features, objects and advantages are achieved by providing a passenger seat recline mechanism including a fixed seat frame member supporting a pivot shaft about which a seat back link and a tray table link independently pivot, a seat back pivotally connected to the seat back link such that the seat back link pivots forward as the seat back reclines, and a tray table leg pivotally connected to the tray table link such that the tray table link pivots along with the seat back link when the tray table leg is stowed and pivots independently of the seat back link when the tray table leg is deployed.

According to another embodiment, the mechanism may further include a tray table stop pin supported by the fixed seat frame member at a position vertically above the pivot shaft.

According to another embodiment, travel of the tray table link may be limited in a forward direction by the seat back link and in a rearward direction by the tray table stop pin.

According to another embodiment, a portion of the tray table link may laterally overlap the seat back link such that the tray table link travels rearward with the seat back link as the seat back link travels rearward.

According to another embodiment, downward travel of the tray table leg may be limited by the tray table link.

According to another embodiment, the pivot shaft and the tray table leg may be pivotally attached to opposing ends of the tray table link.

According to another embodiment, the pivot shaft and the seat back may be pivotally attached to opposing ends of the seat back link.

According to another embodiment, the seat back link and the tray table link may be supported on the pivot shaft between the fixed seat frame member and the seat back.

According to another embodiment, the mechanism may further include a tray table pivotally connected to the tray table leg such that the elevation of the tray table when deployed remains constant irrespective of the position of the seat back.

In another embodiment, an aircraft passenger seat is provided herein including a seat back and a seat bottom supported by a frame, the seat back configured to pivot between upright and reclined positions, a pair of seat back recline and tray table support mechanisms respectively mounted to both sides of the seat back, each mechanism including a pivot shaft supported by a fixed member of the frame about which a seat back link and a tray table link independently pivot, the seat back pivotally connected to the seat back link such that the seat back link pivots forward as the seat back reclines, and a tray table leg pivotally connected to the tray table link such that the tray table link pivots along with the seat back link when the tray table leg is stowed and pivots independently of the seat back link when the tray table leg is deployed, and a tray table pivotally connected to and cooperatively supported between the tray table legs of the mechanisms such that the elevation of the tray table when deployed remains constant irrespective of the position of the seat back.

According to another embodiment, each mechanism may further include a tray table stop pin supported by the fixed seat frame member at a position vertically above the pivot shaft.

According to another embodiment, in each mechanism travel of the tray table link may be limited in a forward direction by the seat back link and in a rearward direction by the tray table stop pin.

According to another embodiment, in each mechanism a portion of the tray table link may laterally overlap the seat back link such that the tray table link travels rearward with the seat back link as the seat back link travels rearward.

According to another embodiment, in each mechanism downward travel of the tray table leg may be limited by the tray table link.

According to another embodiment, in each mechanism the pivot shaft and the tray table leg may be pivotally attached to opposing ends of the tray table link.

According to another embodiment, in each mechanism the pivot shaft and the seat back may be pivotally attached to opposing ends of the seat back link.

According to another embodiment, in each mechanism the seat back link and the tray table link may be supported on the pivot shaft between the fixed seat frame member and the seat back.

According to another embodiment, the tray table may be against the seat back when stowed and spaced apart from the seat back when deployed.

Embodiments of the present invention may include one or more or any combination of the above features.

BRIEF DESCRIPTION OF THE DRAWING FIGURES

The present invention is best understood when the following detailed description of the invention is read with reference to the accompanying drawings, in which.

DESCRIPTION OF THE PREFERRED EMBODIMENT AND BEST MODE

The present invention will now be described more fully hereinafter with reference to the accompanying drawings in which exemplary embodiments of the invention are shown. However, the invention may be embodied in many different forms and should not be construed as limited to the representative embodiments set forth herein. The exemplary embodiments are provided so that this disclosure will be both thorough and complete, and will fully convey the scope of the invention and enable one of ordinary skill in the art to make, use and practice the invention. Like reference numbers refer to like elements throughout the various drawings.

Referring to the figures, provided, herein are passenger seat groupings, recline and tray table support mechanisms for passenger seats, and an integrated fiber optic lighting system for passenger seats. Although the seats and mechanisms are described herein with reference to aircraft seats found in the coach or economy class of a commercial airliner, the mechanisms described herein apply to and may benefit any seat with cradle type motion.

Figure 1:
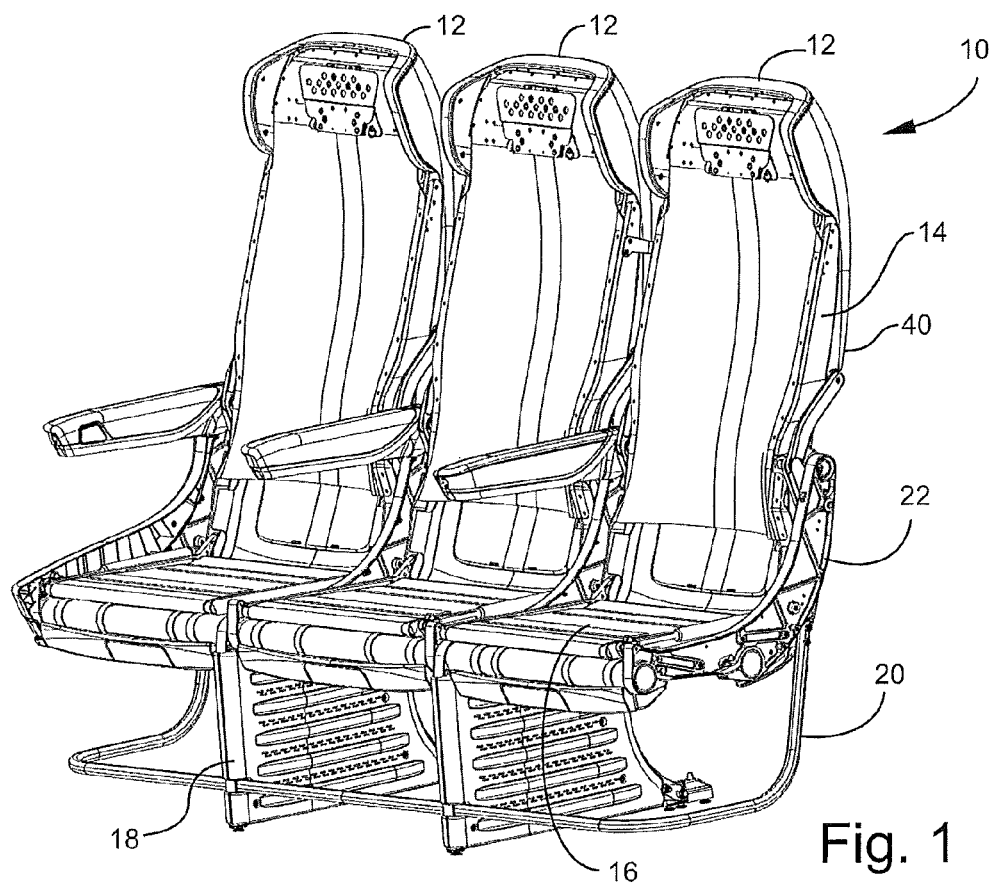
FIG. 1 is an isometric view of a seating group including a plurality of seats each having a recline and tray table support mechanism according to the preferred embodiment of the invention.

Referring to FIG. 1, a seating group is shown generally at reference numeral 10 and includes three laterally adjacent seats 12 supported by a common frame. Each seat 12 is a cradle-type seat with cradle motion in which the seat back 14 pivots relative to the frame between an upright and a reclined position. The seat bottom 16 may or may not adjust with the seat back. The seating group 10 is attached to the floor by one or more legs 18. A footrest/luggage retainer bar 20 extends around the sides and front of the seating group 20 at a position elevated from the floor. Each seat may include a pair of armrests respectively mounted on both sides of the seat. The inboard seat may include only a single armrest or a pair of armrests, one being attached to the seat frame and the other on the interior wall. Frame member 22 is fixed and supports the seat pan 16, seat back 14, and recline and tray table support mechanism, as described in detail below.

Figure 2:
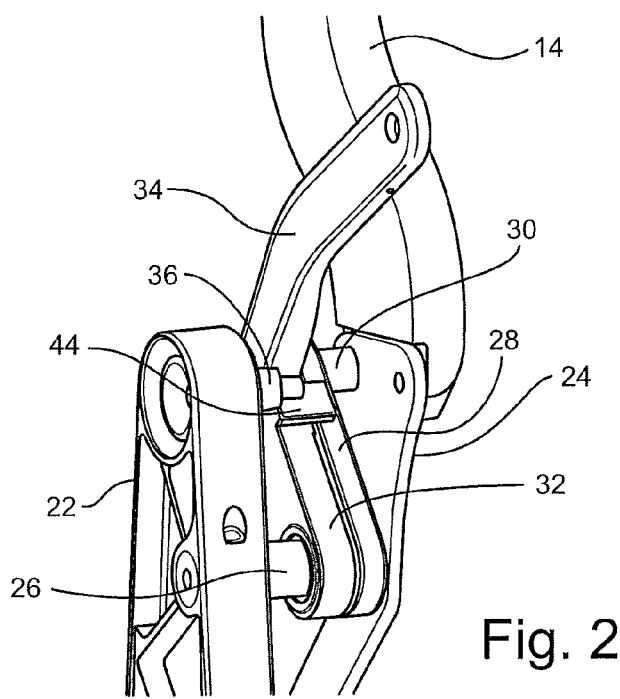
FIG. 2 is a detailed view of the recline and tray table support mechanism positioned alongside a seat in FIG. 1.

Referring to FIG. 2, the passenger seat recline and tray table support mechanism, referred to herein as "the mechanism", generally includes the fixed frame member 22 supporting a pivot shaft 26 about which a seat back link 28 and a tray table link 32 independently pivot. The seat back 14 is pivotally connected to the seat back link 28 such that the seat back link pivots 'forward' (i.e., rotates downward) as the seat back moves from the upright position to the reclined position (i.e., reclines). A tray table leg 34 for supporting a tray table (see FIG. 3 at 40) is pivotally connected to the tray table link 32 such that the tray table link pivots along with the seat back link when the tray table leg is stowed, and pivots independently of the seat back link when the tray table leg is deployed. The mechanism is packaged well to fit within the confines of space found alongside a seat, and specifically, is positioned between the fixed frame member 22 and a seat back frame member referred to herein as the "seat back 14".

The fixed frame member 22 further supports a tray table stop pin 36 at a position vertically above the pivot shaft 26, and a laterally overlapping portion 44 of the tray table link 32 laterally overlaps the top of the seat back link 28. In this arrangement, travel of the tray table link 32, which is positioned adjacent the fixed frame member 22, is limited in the forward (i.e., downward) direction by the seat back link 28, and in the rearward (i.e., upward) direction by the tray table stop pin 36. The tray table link 32 thus has a relatively narrow range of pivoting motion as evidenced by comparing FIGS. 3 and 4. The pivoting range of motion of the tray table link 32 is dependent on the pivoting range of motion of the seat back 14, among other factors. Thus, a seat back with a shallow recline would require a tray table link 32 with a narrow range of pivoting movement, and vice-versa.

The laterally overlapping portion 44 of the tray table link 32 rests on the top of the seat back link 28 such that rearward motion of the seat back link as the seat back 14 moves from reclined to upright carries along with it the tray table link. Because the laterally overlapping portion 44 overlaps only the top surface of the seat back link 28, and because the seat back link 28 and tray table link 32 independently pivot about the pivot shaft 26, the tray table link is free to pivot rearward when the seat back link is forward (i.e., the seat back 14 reclined). In this arrangement, the tray table link 32 and the tray table leg 34 cooperatively adjust to hold the attitude and elevation of the tray table 40 constant when deployed irrespective of the position of the seat back 14, as described in detail below.

Figure 4:
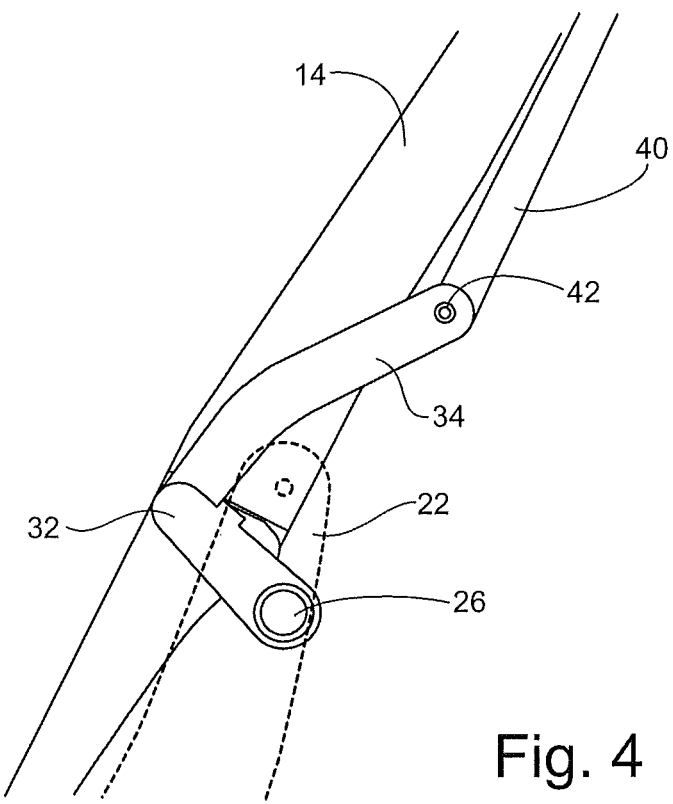
FIG. 4 is a side elevation view of the mechanism showing the seat back reclined and the tray table stowed.

Downward travel of the tray table leg 34 is limited by the tray table link 32, and specifically, the laterally overlapping portion 44 functions as a mechanical stop for the tray table leg as best shown in FIG. 4. The pivot shaft 26 and the seat back 14 are pivotally attached at opposing ends of the seat back link 28. The seat back 14 may include one or more frame members, as shown in FIG. 2 with reference numeral 14 designating an upper seat back member 14 and reference numeral 24 designating a lower seat back member. Connected frame member without a pivot therebetween, as shown, can be used to provide cradle motion in which the seat bottom and seat back move together (i.e., the seat back reclining and translating forward and the front of the seat pan rising and translating forward). Pivoting frame members may be used to provide pivoting movement to only one of the frame members (e.g., seat back). The pivotal connection location of the seat back pivot shaft 30 to the seat back 14 can be adjusted based on the desired pivot axis and seat configuration.

Referring to FIGS. 3-6, the seat back 14 is shown in both upright and reclined positions with the tray table 40 stowed and deployed in each of the seat back positions. Although only the fully upright and fully reclined seat back positions are shown, it should be understood that the seat back 14 is steplessly adjustable between these two extreme positions, and the tray table link 32 and tray table leg 34 adjust accordingly to maintain the position of the deployed tray table 40.

Figure 3:
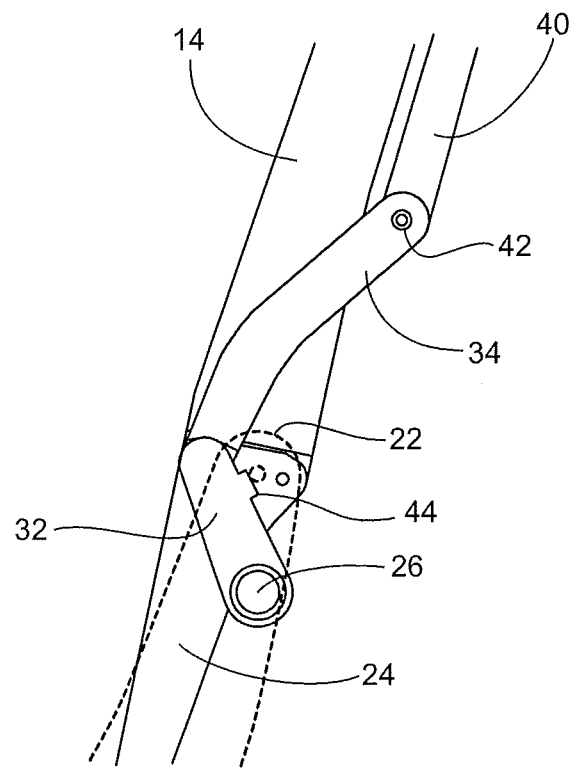
FIG. 3 is a side elevation view of the mechanism showing the seat back upright and the tray table stowed.

Referring to FIG. 3, the seat back 14 is shown fully upright and the tray table 40 is shown stowed flush against the seat back. In this configuration, the tray table link 32 and seat back link 28 are both in their rearwardmost position and aligned when viewed from the side of the seat. With the tray table 40 stowed, the tray table leg 34 is in its uppermost position.

Referring to FIG. 4, the seat back 14 is shown fully reclined and the tray table 40 is shown stowed flush against the seat back. In this configuration, the tray table link 32 and the seat back link 28 are aligned when viewed from the side, but are in their forwardmost positions. The position of the tray table leg 34 when stowed remains the same with respect to the seat back 14 in either the upright or reclined positions, as evidenced by comparing FIGS. 3 and 4. The tray table support link 32 moves forward to accommodate the change in the position of the lower end of the tray table leg 34 with respect to the pivot shaft 26.

Figure 5:
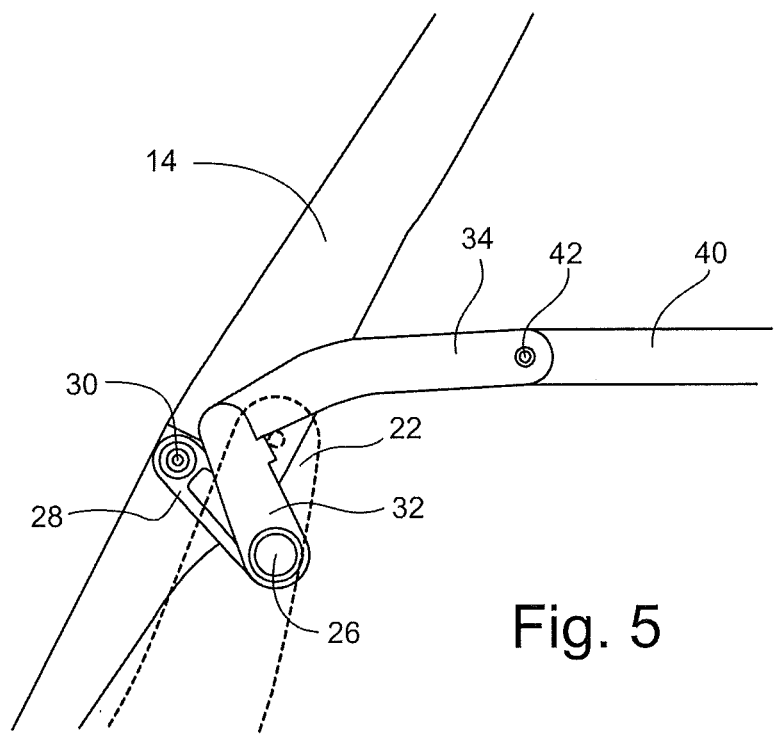
FIG. 5 is a side elevation view of the mechanism showing the seat back reclined and the tray table deployed.

Referring to FIG. 5, the seat back 14 is shown fully reclined and the tray table 40 is shown deployed and substantially horizontal. In this configuration, the seat back link 28 has moved forward to recline the seat, while the tray table link 32 has remained rearward, thus illustrating the independent pivoting movement about the pivots shaft 26. To deploy the tray table 40, the tray table leg 44 travels downward until making contact with the overlapping portion 44 of the tray table link 32 which acts as the mechanical stop. The pivoting range of motion of the tray table leg 34 and the bent shape of the tray table leg collectively position the tray table 40 at a predetermined, comfortable elevation for use by the aft-seated passenger. The pivoting range of motion of the tray table 40 with respect to its pair of tray table legs 34 can be achieved by conventional means not discussed herein.

Figure 6:
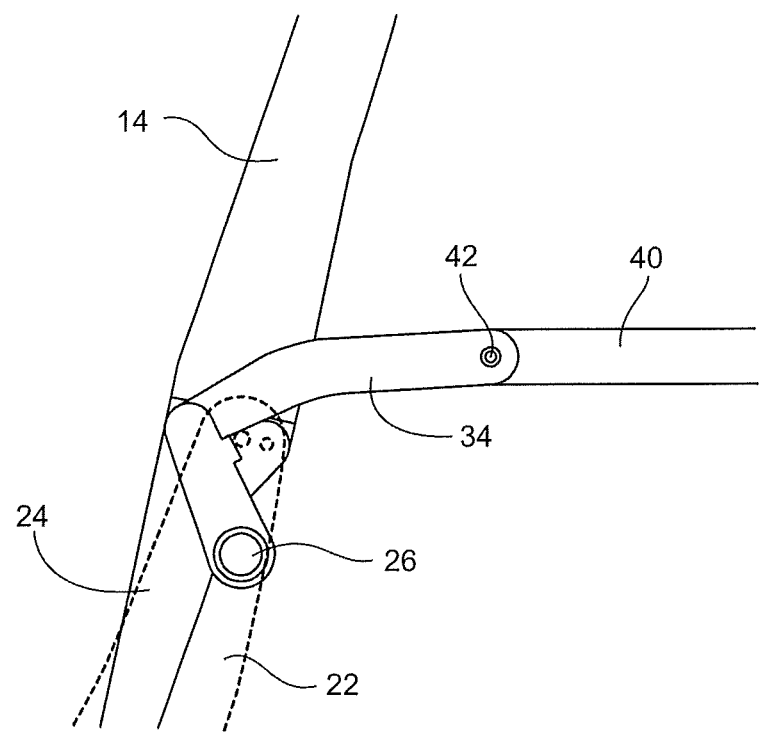
FIG. 6 is a side elevation view of the mechanism showing the seat back upright and the tray table deployed.

Referring to FIG. 6, the seat back 14 is shown fully upright and the tray table 40 is shown deployed. In this configuration, the seat back 28 and tray table link 32 are aligned and in their rearwardmost positions. Comparing FIGS. 5 and 6, in which the tray table 40 is deployed, it is evident that the seat back 14 and seat back link 28 pivot independently about the tray table link 32, even though the seat back link and tray table link are mount on common pivot shaft 26.

Figure 7:
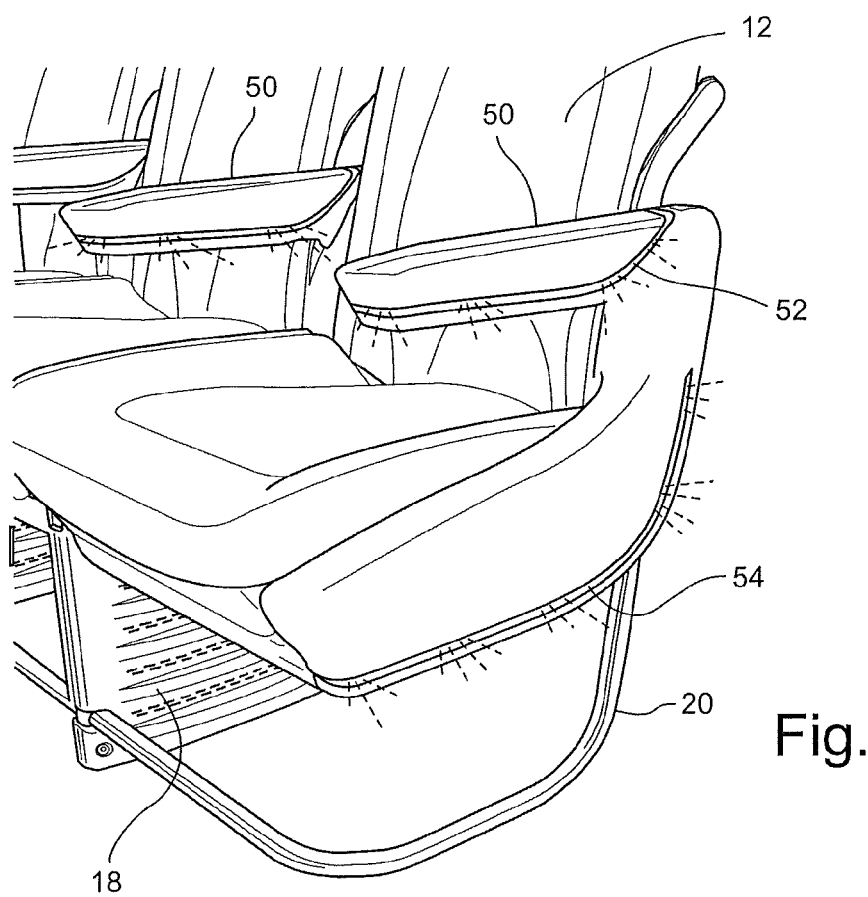
FIG. 7 is a front and side perspective view of a passenger seat grouping including integrated fiber optic lighting.
Figure 8:
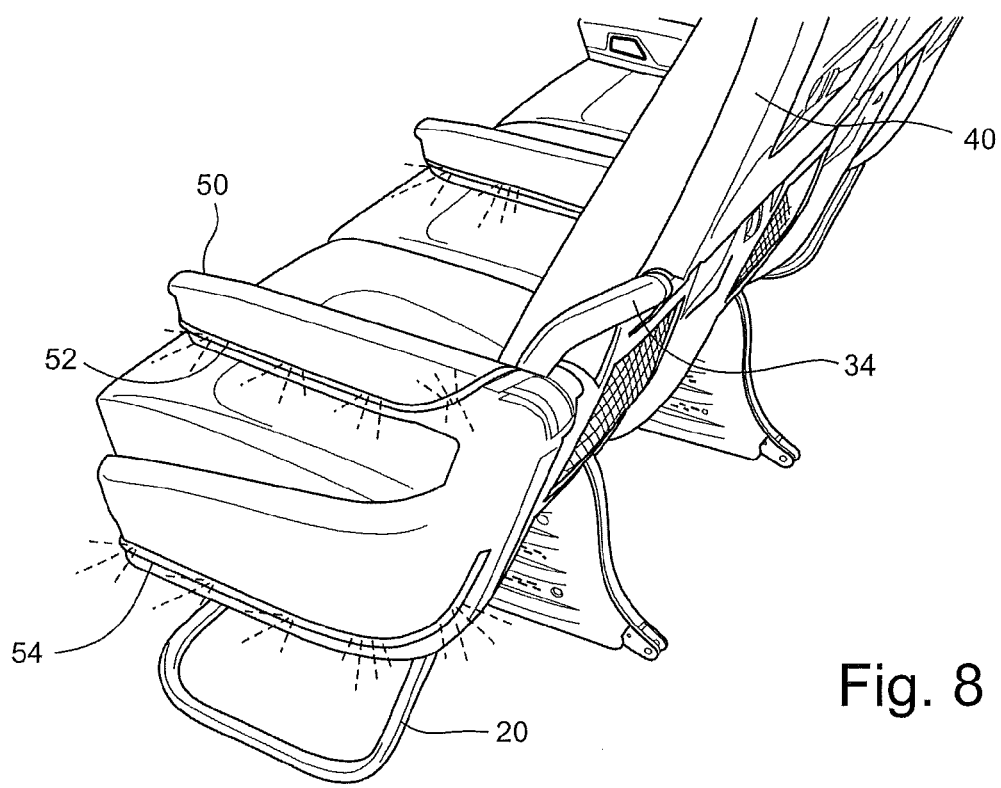
FIG. 8 is a rear and side perspective view of a passenger seat grouping including integrated fiber optic lighting.

Referring to FIGS. 7 and 8, in addition to the seat recline and tray table support mechanism, the seat or seating group may optionally/additionally include an integrated lighting feature. Like FIG. 1, the seating group shows in FIGS. 7 and 8 include three laterally adjacent seats forming a row. The seating group includes an aisle seat, a window seat and a wall seat. The aisle seat includes an elongate fiber optic light 52 that extends along the bottom edge of the aisle side armrest 50, and an elongate fiber optic light 54 that extends along the bottom and rear edges of the bumper. The light 52 also extends across the front and rear ends of the armrest 50. The middle and window seats can also include fiber optic lights on respective armrests, etc.

The length of the fiber optic lights 52, 54 permit the emitted light to be evenly distributed as illustrated by the imaginary illumination lines. The fiber optic lights themselves are partially hidden behind a shroud so that light is reflected downwardly onto the surrounding seat surfaces and aisle. This directs the light and permits the light to be diffused, which reduces the harshness of the light and adds aesthetic appeal. The power source is very flexible and is not limited to direct aircraft power, IFE, seat actuation or PC power boxes. The ability to provide this additional lighting source is particularly useful in dark cabins, such as are typically present during overnight flights. The lighting can aid in finding lost items and general navigation throughout the cabin.

The lights may be contained in flexible transparent tubing that can be conformed to the desired shape of the length of lighting, or in a rigid tube that is formed to the desired shape. In either case the lights 52, 54 may be positioned under a shroud, as noted above, so that the emitted light is directed downwardly onto the adjacent seat surfaces. The lights 52, 54 are controlled by the flight crew and the aircraft's power system in the same manner as the other cabin lighting. While the disclosure of the integrated lighting feature is made with reference to a coach class seating group, the lighting feature can be used on any seat or seating group and in any seating class.

The particular shape of the lights 52, 54 may be dictated by the shape of the bumper, armrest, or other structure. While the invention has been described with reference to fiber optics, other light sources capable of being formed or incorporated into elongate structures, such as light emitting diodes (LEDs) and halogen lights, are envisioned.

While a passenger seat recline and tray table support mechanism, and a lighting feature have been described herein with reference to specific embodiment and examples, various details of the invention may be changed without departing from the scope of the invention. Furthermore, the foregoing description of the preferred embodiments of the invention and best mode for practicing the invention are provided for the purpose of illustration only and not for the purpose of limitation.

What is claimed is:

1. A passenger seat recline mechanism, comprising:
a fixed seat frame member supporting a pivot shaft about which a seat back link and a tray table link independently pivot;
a seat back pivotally connected to the seat back link such that the seat back link pivots forward as the seat back reclines; and
a tray table leg pivotally connected to the tray table link such that the tray table link pivots along with the seat back link when the tray table leg is stowed and pivots independently of the seat back link when the tray table leg is deployed.

2. The passenger seat recline mechanism of claim 1, further comprising a tray table stop pin supported by the fixed seat frame member at a position vertically above the pivot shaft.

3. The passenger seat recline mechanism of claim 2, wherein travel of the tray table link is limited in a forward direction by the seat back link and in a rearward direction by the tray table stop pin.

4. The passenger seat recline mechanism of claim 1, wherein a portion of the tray table link laterally overlaps the seat back link such that the tray table link travels rearward with the seat back link as the seat back link travels rearward.

5. The passenger seat recline mechanism of claim 1, wherein downward travel of the tray table leg is limited by the tray table link.

6. The passenger seat recline mechanism of claim 1, wherein the pivot shaft and the tray table leg are pivotally attached to opposing ends of the tray table link.

7. The passenger seat recline mechanism of claim 1, wherein the pivot shaft and the seat back are pivotally attached to opposing ends of the seat back link.

8. The passenger seat recline mechanism of claim 1, wherein the seat back link and the tray table link are supported on the pivot shaft between the fixed seat frame member and the seat back.

9. The passenger seat recline mechanism of claim 1, further comprising a tray table pivotally connected to the tray table leg such that the elevation of the tray table when deployed remains constant regardless of the position of the seat back.

10. An aircraft passenger seat, comprising:
   a seat back and a seat bottom supported by a frame, the seat back configured to pivot between upright and reclined positions;
   a pair of seat back recline and tray table support mechanisms respectively mounted to both sides of the seat back, each mechanism including a pivot shaft supported by a fixed member of the frame about which a seat back link and a tray table link independently pivot, the seat back pivotally connected to the seat back link such that the seat back link pivots forward as the seat back reclines, and a tray table leg pivotally connected to the tray table link such that the tray table link pivots along with the seat back link when the tray table leg is stowed and pivots independently of the seat back link when the tray table leg is deployed; and
   a tray table pivotally connected to and cooperatively supported between the tray table legs of the mechanisms such that the elevation of the tray table when deployed remains constant regardless of the position of the seat back.

11. The passenger seat of claim 10, wherein each mechanism further comprises a tray table stop pin supported by the fixed seat frame member at a position vertically above the pivot shaft.

12. The passenger seat claim 11, wherein in each mechanism travel of the tray table link is limited in a forward direction by the seat back link and in a rearward direction by the tray table stop pin.

13. The passenger seat of claim 10, wherein in each mechanism a portion of the tray table link laterally overlaps the seat back link such that the tray table link travels rearward with the seat back link as the seat back link travels rearward.

14. The passenger seat of claim 10, wherein in each mechanism downward travel of the tray table leg is limited by the tray table link.

15. The passenger seat of claim 10, wherein in each mechanism the pivot shaft and the tray table leg are pivotally attached to opposing ends of the tray table link.

16. The passenger seat of claim 10, wherein in each mechanism the pivot shaft and the seat back are pivotally attached to opposing ends of the seat back link.

17. The passenger seat of claim 10, wherein in each mechanism the seat back link and the tray table link are supported on the pivot shaft between the fixed seat frame member and the seat back.

18. The passenger seat of claim 10, wherein the tray table is against the seat back when stowed and spaced apart from the seat back when deployed.

* * * * *